No. 695,514. Patented Mar. 18, 1902.
G. WILCOX.
PROCESS OF SECURING HEADS TO CANS.
(Application filed Mar. 9, 1900. Renewed June 4, 1901.)
(No Model.) 2 Sheets—Sheet 1.
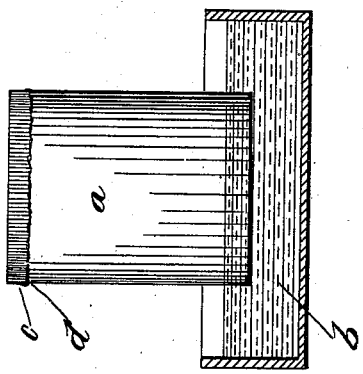
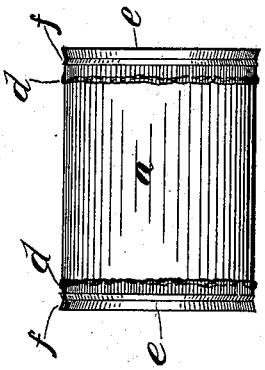
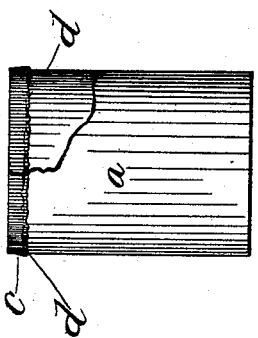
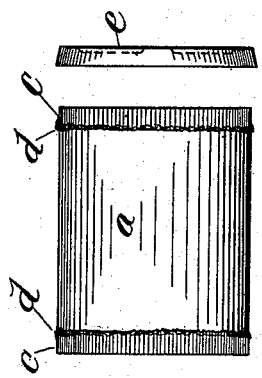
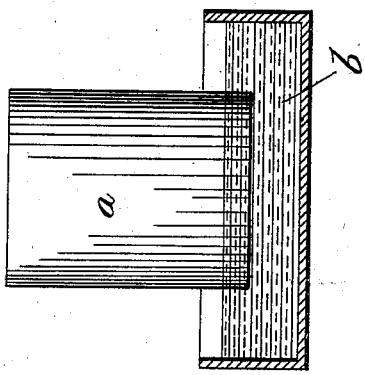
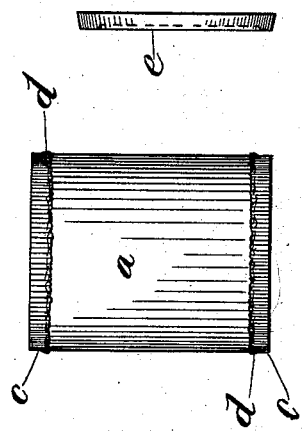
Witnesses:
J. D. McMahon.
G. S. Noble.
Inventor,
George Wilcox
By Joseph G. Parkinson
Att'y.
THE NORRIS PETERS CO., PHOTO-LITHO., WASHINGTON, D. C.

No. 695,514. Patented Mar. 18, 1902.
G. WILCOX.
PROCESS OF SECURING HEADS TO CANS.
(Application filed Mar. 9, 1900. Renewed June 4, 1901.)
(No Model.) 2 Sheets—Sheet 2.
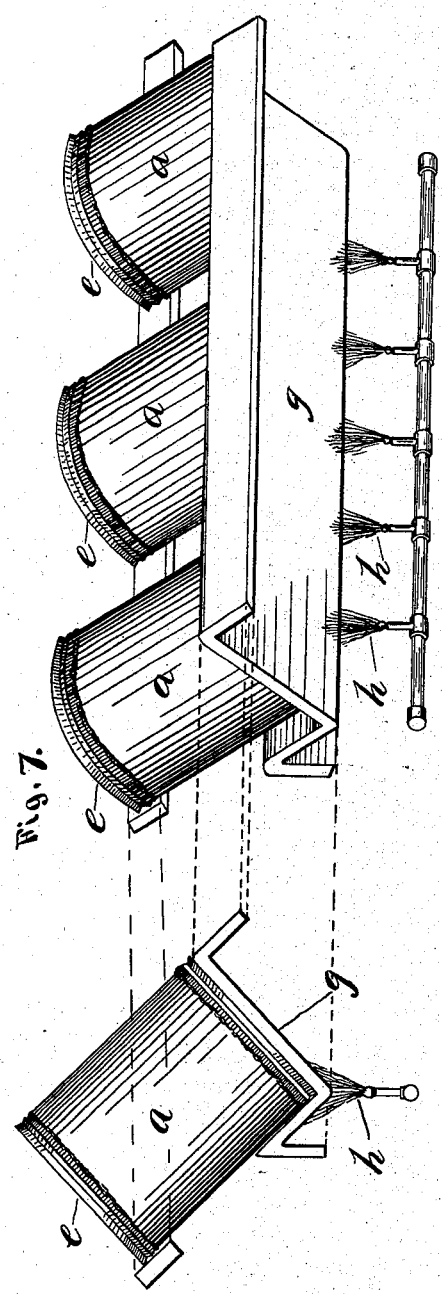
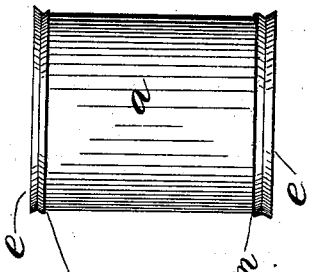
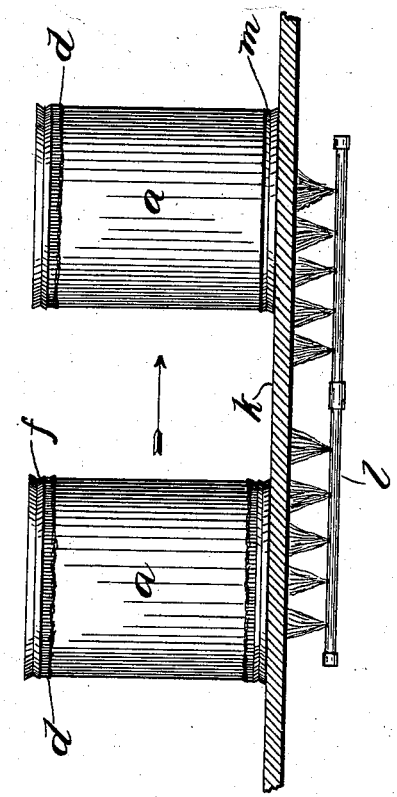
Witnesses:
J. D. McMahon.
G. S. Noble
Inventor,
George Wilcox
By Joseph G. Parkinson
Atty.

UNITED STATES PATENT OFFICE.

GEORGE WILCOX, OF LOS ANGELES, CALIFORNIA, ASSIGNOR TO AMERICAN CAN COMPANY, OF JERSEY CITY, NEW JERSEY, A CORPORATION OF NEW JERSEY.

PROCESS OF SECURING HEADS TO CANS.

SPECIFICATION forming part of Letters Patent No. 695,514, dated March 18, 1902.

Application filed March 9, 1900. Renewed June 4, 1901. Serial No. 63,155. (No specimens.)

*To all whom it may concern:*

Be it known that I, GEORGE WILCOX, a citizen of the United States, residing at Los Angeles, in the county of Los Angeles and State of California, have invented or discovered a certain new and useful Process of Securing Heads to Cans, of which the following is a specification.

My invention relates to the manufacture of tin cans, and particularly to the method of soldering the tops and bottoms to the body of the can after the side seam in the latter has been formed, and has for its object to economize the use of expensive solder and to form a more perfect and reliable seam.

Heretofore the customary practice has been to press the heads forming the top or bottom onto the body or cylinder of the can and then roll the can edgewise through a bath of molten solder, the body meanwhile traveling on a stationary support inclining from the surface of the bath at an angle of about twenty degrees, after which the can is turned upright on the cooler-belt to be cooled, when after the second end is treated in like manner it is passed to the tester and is finished. In one instance of which I am aware it has been proposed to apply the solder to the end of the can-body before the head, whether top or bottom, is put thereon, make the head of relatively scant diameter, expand it by heating, apply it and shrink it upon the body, and then fuse the solder and complete the seam by a second heating operation.

In my invention I propose to take the can-body as it comes from the side-seamer, which solders the longitudinal seam therein, then preferably apply flux to both ends, although not absolutely necessary at this stage of the proceedings, dip one end or the raw edge thereof into a bath of molten solder and withdraw it, turn it uppermost and allow the solder to cool thereon, next dip the other end, turn it uppermost and allow it to cool in its order, run the body through the fluxing-machine and succeeding this apply the heads, and finally melt the solder and amalgamate body and heads together by heat applied beneath first one head and then the other, as by rolling the can at an inclination in a heated way with the headed end to be seamed at the base of the way or by sliding said headed end over a horizontally-trending metallic plate fired from underneath.

For the purpose of explaining my invention I will refer to the accompanying drawings, in which—

Figure 1 represents the can-body with side seam completed and being dipped by one end in the bath. Fig. 2 represents said body after dipping inverted, in which position the solder has cooled. Fig. 3 represents the can-body being dipped a second time to apply solder to the opposite end. Fig. 4 represents said body withdrawn from the bath inverted to bring the end last dipped uppermost and with the solder now cooled at both ends and collected in annular ribs at a short remove from the edges. Fig. 5 shows the body thus prepared with the heads about to be applied as in a heading-machine. Fig. 6 shows the body with the heads applied and crimped, but the solder as yet unmelted and the seam unfinished. Fig. 7 illustrates the preferable mode of melting the solder and completing the amalgamation of the seams. Fig. 8 illustrates an alternative mode of melting said solder and amalgamating the seam, and Fig. 9 represents the completed can.

Reference-letter $a$ designates a can-body or cylinder in which the side seam has previously been formed and completed, and $b$ is a bath of molten solder in which one end of the body to which flux has preferably but not necessarily been previously applied is dipped and then withdrawn to permit the solder to cool thereon. The body is turned to a vertical position after dipping, with the dipped edge uppermost, as in Fig 2, so that the solder may flow back from the edge, the result being that an annular space or seam-section $c$ is left extending one-fourth to three-eighths of an inch from the edge and either entirely bare or covered with an extremely tenuous film of solder and a rib $d$ of solder accumulated and hardened at the base of this film both inside and outside of the body, the edges and that part of the periphery with which the heads are to be engaged being left smooth and even and in perfect condition to receive said heads. It is not advisable to invert the body too precipitately after dipping lest the fluid solder run too far down the sides of the can or become too much dispersed, failing to form well-defined and regular ribs within suitable proximity to the dipped edge. It is advisable to permit just sufficient interval to elapse for the solder to attain a sluggish consistency, so that it may creep down slowly and homogeneously and harden within the prescribed distance. The space $c$, however, should be left practically clean of solder, as any appreciable collection at or near the edges will expand the flanges of the heads and prevent putting them on tightly, a desideratum if perfect seams are to be formed. Practically the film, if any, left by the retreat of the solder from the edge will be of such exceeding tenuity that it will not interfere with tight contact between the flanged head and the body; but as a safeguard the space $c$ may be wiped before the solder has cooled and set with wipers of asbestos or other suitable material, or the can may be dipped and then wiped without absolute inversion in such manner as to force the solder back from the edge and cause it to harden in a rib corresponding to the rib $d$ and in the same position.

One end of the can-body having been dipped and cooled, as above, the other end is then dipped, inverted, and cooled, as represented in Figs. 3 and 4, and next the body is advisably passed through a fluxing-machine or flux in other suitable manner applied to both ends. Fluxing at this stage is very necessary and almost indispensable. The body is now ready to receive the heads $e$, which may be simultaneously applied at each end by means of the usual heading-machine, as suggested in Fig. 5, which shows the relative position of heads and body at the moment the plungers move to drive the heads upon the body, or may be accomplished in any other suitable manner. Preferably this step is followed by crimping the heads upon the body, bringing the can into the condition represented in Fig. 6, with both heads crimped, as at $f$, and with the annular ribs of solder $d$ encircling the body at a short remove from the crimped flanges; but whether crimping is resorted to or not may be made to depend in some measure upon the initial fit of the heads. With due regard to this it is possible to ignore it. Finally heat is to be applied while the rib of solder is above the head to be seamed to fuse the solder and cause it to flow down into the seam. The best mode of doing this now known to me is to support the can at an inclination, the head to be seamed undermost, in a metallic way or trough $g$, heated beneath by flames $h$, and roll it from one end to the other, the way being of a sufficient length to permit at least one full revolution of the can and advisably something more. By this means the solder is fused, runs down into the seam, and is kept in a state of agitation a sufficient length of time to insure a thorough soaking of said seam. Then after cooling the seam thus formed the opposite end of the can is treated in like manner, resulting in the finished can represented in Fig. 9, which is ready to go to the tester. Another way of fusing the seam, though perhaps not as advantageous as the foregoing, is to rest the can, head end down, as indicated in Fig. 8, upon a metal plate or slideway $k$, heated underneath by firing apparatus $l$, and sliding it thereover with the accession of other cans, as indicated by the arrow. The result is that as the heat creeps up through the head and along the side of the can the film, if any, and the rib are melted in succession, the molten stuff flowing down from the condition indicated at the left hand of Fig. 8 into the seam between head and body, as at $m$, to the right hand of said figure, evenly filling the seam and perfectly amalgamating the body and head together.

It is obvious that one end may be dipped and one head applied and seamed before the dipping, applying, and seaming at the other end and that other changes or modifications may be made without departing from the spirit of my invention, and therefore I do not limit myself to the precise details or steps of the process herein described; but What I do claim, and desire to secure by Letters Patent, is—

1. The improvement in the art of forming seams in sheet-metal cans, consisting in dipping one member into molten solder, forming a rib-like deposit above the seam-section thereof, arranging the members of said seam, and applying heat to cause the rib to melt and soak down into the seam, substantially as described.

2. The improvement in the art of seaming sheet-metal cans, consisting in dipping one seam edge into a bath of molten solder, wiping said edge along the seam-section thereof, allowing the solder to cool in a rib beyond the wiped section and separated from the edge by said section, fitting the members of the seam and arranging them with said rib uppermost, and applying heat to melt the rib and cause it to soak down into the seam.

3. The improvement in the art of seaming sheet-metal cans, consisting in dipping one seam edge into molten solder, inverting to bring said edge uppermost while the solder thereon is still in a state of fusion, and permitting said solder to creep down and cool on the metal in a rib-like deposit parallel with said edge but clear of the seam-section thereof, fitting the members of said seam and arranging them with the rib above the upper line thereof, and applying heat to cause said rib to melt and soak down into the seam.

4. The improvement in the art of applying heads to can-bodies, consisting in taking the can-body after the side seam has been formed, dipping the end into a bath of molten solder, causing said solder to cool in a rib thereon removed from and practically parallel with the dipped edge, applying a head to said end, placing the can with headed end down, and applying heat to fuse the rib of solder and cause it to soak into the seam.

5. The improvement in the art of applying heads to cans, consisting in taking the can-body after the side seam has been formed, dipping the end into a bath of molten solder, wiping said can circumferentially adjacent to the dipped edge, allowing the solder to cool in an annular rib around said body beyond the wiped end thereof, applying a head over the wiped end, placing the can with headed end down, and applying heat, whereby said solder is caused to melt and run down into the seam between head and body.

6. The improvement in the art of applying heads to can-bodies, consisting in taking the can-body after the side seam has been formed, dipping the end into a bath of molten solder, inverting the body to allow the solder to creep down the side and cool in an annular rib thereon, applying a head over the dipped and cooled end, positioning the body to bring the head underneath, and applying heat to fuse the rib and collect the molten solder in the seam.

7. The improvement in the art of applying heads to can-bodies, consisting in taking the can-body after the side seam has been formed, dipping the end into a bath of molten solder, inverting the body to allow the solder to creep down the side and cool in an annular rib thereon, applying a head over the dipped and cooled edge, positioning the body at an inclination with head down, and then applying heat beneath and concurrently imparting a rolling movement to said headed can to fuse and agitate the solder and cause it to soak into the seam.

8. The improvement in the art of applying heads to can-bodies, consisting in taking the can-body after the side seam has been formed, dipping the end into a bath of molten solder, inverting the body to allow the solder to creep down the side and cool in an annular rib thereon, applying flux to the end thus dipped, fitting a head over said end, positioning the body to bring the head underneath, and applying heat.

9. The improvement in the art of applying heads to can-bodies, consisting in taking the can-body after the side seam has been formed, dipping first one end and then the other into a bath of molten solder, with an inversion of the body after each dipping to permit the solder to creep away from the dipped edge and cool in an annular rib parallel therewith but removed therefrom, applying heads to both ends, and then positioning the can first with one head downward and then the other and applying heat while so positioned.

10. The improvement in the art of applying heads to can-bodies, consisting in taking the can-body after the side seam has been formed, dipping first one end and then the other into a bath of molten solder with an inversion of the body after each dipping to permit the solder to creep away from the dipped edge and cool in an annular rib parallel therewith but removed therefrom, fluxing both of said ends, applying heads thereto, and then positioning the can first with one head below and then the other and applying heat while so positioned.

11. The improvement in the art of applying heads to can-bodies, consisting in taking the can-body after the side seam has been formed, dipping first one end and then the other into a bath of molten solder with an inversion of the body after each dipping to permit the solder to creep away from the dipped edge and cool in a rib on the body removed from said edge, applying heads to said ends, then placing the can in an inclined position first with one head down and then the other and applying heat beneath or adjacent to the lowermost head accompanied with a rolling or rotary movement imparted to said can.

12. The improvement substantially as herein described, the same consisting in forming seams, in sheet metal, by first forming upon the sheet constituting one member, an adhering rib or bead of solder, said solder being applied when molten and located at a distance from the edge but adjacent to the seam-section of said sheet when it is allowed to set; then applying to said member the other member to be soldered thereto, then placing the united members in position with the said rib or bead above the seam, and finally applying heat to melt the solder and flow the seam, substantially as described.

13. The process herein described consisting in forming on the sheet metal back from the seaming-section of the blank adjacent thereto and on the plain surface of the metal a bead or rib of solder by applying said solder when molten, allowing the same to set, then applying to said member the other member in the position in which it is to be united thereto, and with the rib or bead above the seam and then applying heat to melt the solder and flow the seam, substantially as described.

14. The process consisting in immersing the end of a can-body in a bath of molten solder, removing or separating it therefrom and inverting it before the solder sets to allow the solder to creep down and cool in a rib-like deposit thereon, substantially as described.

15. The process consisting in immersing the edge of a sheet-metal blank in a bath of molten solder, removing or separating it therefrom and inverting it before the solder sets to allow the solder to creep down and cool in a rib-like deposit thereon, substantially as described.

16. The process consisting in applying molten solder to the edge of a sheet-metal blank and holding the blank with its molten-solder-coated edge uppermost before and while the solder thereon sets to allow the solder to creep down and cool in a rib-like deposit thereon removed from the extreme edge or seam-section of the sheet-metal blank, substantially as described.

GEORGE WILCOX.

Witnesses:
 GEORGE G. JOHNSON,
 L. S. PORTER.